United States Patent [19]

Kim

[11] Patent Number: 5,552,895
[45] Date of Patent: Sep. 3, 1996

[54] DOUBLE-DECK MAGNETIC RECORDING/REPRODUCING APPARATUS

[75] Inventor: Sang-uk Kim, Suwon-city, Rep. of Korea

[73] Assignee: Samsung Electronics Co., Ltd., Kyungki-do, Rep. of Korea

[21] Appl. No.: 366,903

[22] Filed: Dec. 30, 1994

[30] Foreign Application Priority Data

Dec. 31, 1993 [KR] Rep. of Korea .................. 93-32294

[51] Int. Cl.$^6$ ................................................. H04N 9/79
[52] U.S. Cl. ........................... 358/310; 358/311; 358/330
[58] Field of Search ................................. 358/310, 333, 358/311, 335; H04N 9/79

[56] References Cited

U.S. PATENT DOCUMENTS

| | | | |
|---|---|---|---|
| 5,057,934 | 10/1991 | Yun et al. | 358/330 |
| 5,126,851 | 6/1992 | Yoshimura et al. | 358/311 |
| 5,323,243 | 6/1994 | Cheon | 358/311 |

Primary Examiner—Thai Q. Tran
Attorney, Agent, or Firm—Sughrue, Mion, Zinn, Macpeak & Seas

[57] ABSTRACT

A double-deck magnetic recording/reproducing apparatus includes first and second recording/reproducing portions for, during playback, receiving an FM video signal for a first (or second) format and a chrominance signal, and mixing an FM-modulated video signal and a converted-up chrominance signal to output a composite video signal, and, during recording, separating an input composite video signal into a video signal and a chrominance signal, FM-modulating the separated video signal, and converting down the separated chrominance signal to record the converted signal on the tape for the first (or second) format, an FM converter for receiving playback FM video signals from the first and second recording/reproducing portions and outputting a recording FM video signal in which the frequency band is converted from one format to the other format; a first switch which selectively supplies the recording FM video signal of the first recording/reproducing portion and the recording FM video signal of the FM converter to a recording head for the tape for the first format and a second switch which selectively supplies the recording FM video signal of the second recording/reproducing portion and the recording FM video signal of the FM converter to a recording head for the tape for the second format.

4 Claims, 3 Drawing Sheets

DOUBLE-DECK MAGNETIC RECORDING/REPRODUCING APPARATUS

BACKGROUND OF THE INVENTION

The present invention relates to a double-deck magnetic recording/reproducing apparatus, and more particularly, to a double-deck magnetic recording/reproducing apparatus which can use 8 mm- and VHS-format magnetic tapes in recording and reproducing.

The ongoing miniaturization of camcorders has involved the use of both 0.5-inch VHS-format tape and 8 mm tape. The 8 mm tape recorded with an 8 mm camcorder cannot be reproduced by an ordinary VHS videocassette recorder for home use. Recently, a double-deck videocassette recorder, which can record/reproduce both tape types by mounting an 8 mm deck and VHS deck together in one set, has been introduced.

Such a double-deck videocassette recorder is capable of copying or editing a video signal of the 8 mm tape or VHS tape onto the other type of tape. Since the recording frequency band for the 8 mm video signal is 4.2–5.4 MHz while that for the VHS video signal is 3.4–4.4 MHz, the FM signal cannot be copied directly. In order to copy the FM signal, a reproduced FM signal of a first format is demodulated, a composite video signal is transmitted, and the transmitted composite video signal is modulated into an FM signal of a second format.

Through this signal conversion procedure with respect to the composite video signal, noise is introduced and the image quality is deteriorated accordingly.

SUMMARY OF THE INVENTION

Therefore, in order to overcome such a problem, it is an object of the present invention to provide a double-deck magnetic recording/reproducing apparatus which is capable of directly copying a playback FM signal of a first format tape onto a second format tape.

To accomplish the above object of the present invention, there is provided a double-deck magnetic recording/reproducing apparatus for recording/reproducing a tape for a first format and a tape for a second format, comprising: a first recording/reproducing portion for, during playback, receiving an FM video signal of a first frequency band picked up from the tape for the first format and a chrominance signal converted down into a first frequency, and mixing an FM-modulated video signal and a converted-up chrominance signal to output a composite video signal, and, during recording, separating an input composite video signal into a video signal and a chrominance signal, FM-modulating the separated video signal into the band of the first frequency, and converting down the separated video signal into the first frequency to record the converted signal on the tape for the first format; a second recording/reproducing portion for, during playback, receiving an FM video signal of a second frequency band picked up from the tape for the second format and a chrominance signal converted down into a second frequency, and mixing an FM-modulated video signal and a converted-up chrominance signal to output a composite video signal, and, during recording, separating an input composite video signal into a video signal and a chrominance signal, FM-modulating the separated video signal into the band of the second frequency, and converting down the separated video signal into the second frequency to record the converted signal on the tape for the second format; an FM converter for receiving playback FM video signals from the first and second recording/reproducing portions and outputting a recording FM video signal in which the frequency band is converted from one format received according to a given copying mode to the other format; first switching means for selectively supplying the recording FM video signal of the first recording/reproducing portion and the recording FM video signal of the FM converter to a recording head for the tape for the first format according to the given copying mode; and second switching means for selectively supplying the recording FM video signal of the second recording/reproducing portion and the recording FM video signal of the FM converter to a recording head for the tape for the second format according to the given copying mode.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
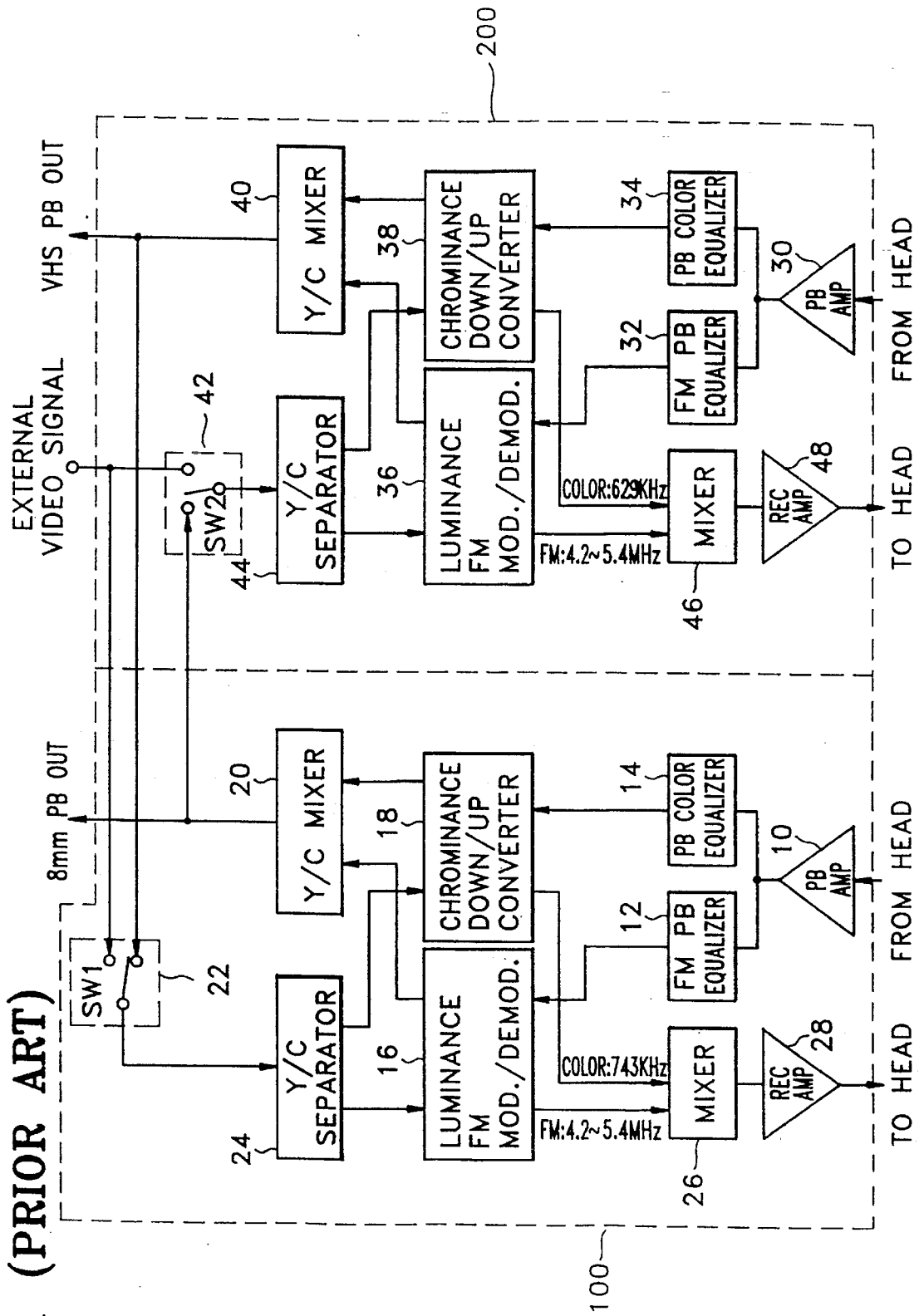
FIG. 1 is a configuration diagram of a conventional double-deck magnetic recording/reproducing apparatus.

Referring to FIG. 1, a recording/reproducing system 100 for 8 mm tape amplifies a signal picked up from a playback head by a playback (PB) amplifier 10, during playback. The amplified playback signal is equalized to a playback FM video signal of 4.2–5.4 MHz by an FM playback (PB) equalizer 12 and to a playback chrominance signal of 743 KHz by a playback (PB) color equalizer 14. The equalized playback FM video signal is demodulated in a modulator/demodulator 16 and output as a video signal. The equalized playback chrominance signal is converted up and output as a chrominance signal. The output video signal and chrominance signal are mixed in a Y/C mixer 20 and output as a composite video signal.

In recording, an external composite video signal and a composite video signal supplied from a VHS recording/reproducing system 200 are selectively input by a first switch (SW1) 22. The input composite video signal is separated into a video signal and chrominance signal in a Y/C separator 24. The separated video signal is modulated in modulator/demodulator 16 and output as a recording FM video signal of the frequency band of 4.2–5.4 MHz. The separated chrominance signal is converted down to 743 KHz in a chrominance down/up converter 18. The recording FM video signal and converted-down chrominance signal are mixed in mixer 26, amplified in a recording (REC) amplifier 28, and recorded on the 8 mm tape by a recording head.

The recording/reproducing system 200 for the VHS tape, amplifies a signal picked up from a playback head by a playback amplifier 30, during playback. The amplified playback signal is equalized to a playback FM video signal of 3.4– 4.4 MHz by an FM equalizer 32 and to a playback chrominance signal of 629 KHz by a color equalizer 34. The equalized playback FM video signal is demodulated in a modulator/demodulator 36 and output as a video signal. The equalized playback chrominance signal is converted up in chrominance up/down converter 38 and output as a chrominance signal. The output video signal and chrominance signal are mixed in a mixer 40 and output as a composite video signal.

In recording, an external composite video signal and a composite video signal supplied from 8 mm recording/reproducing system 100 are selectively input by a second switch (SW2) 42. The input composite video signal is separated into a video signal and chrominance signal in a separator 44. The separated video signal is modulated in modulator/demodulator 36 and output as a recording FM video signal of the frequency band of 3.4– 4.4 MHz. The separated chrominance signal is converted down to 629 KHz in a chrominance down/up converter 38. The recording FM video signal and converted-down chrominance signal are mixed in mixer 46, amplified in a recording amplifier 48, and recorded on the VHS tape by a recording head.

In such a conventional method, the frequency characteristic of an original signal is deteriorated through the modulation/demodulation of the video signal. After being copied three or four times, the shape and edges of an image contour are collapsed to create white stains, resulting in a poor quality image.

In order to overcome the problem, the purpose of the present invention is to present an apparatus for directly copying the FM signal without the intervening modulation or demodulation operation.

Figure 2:
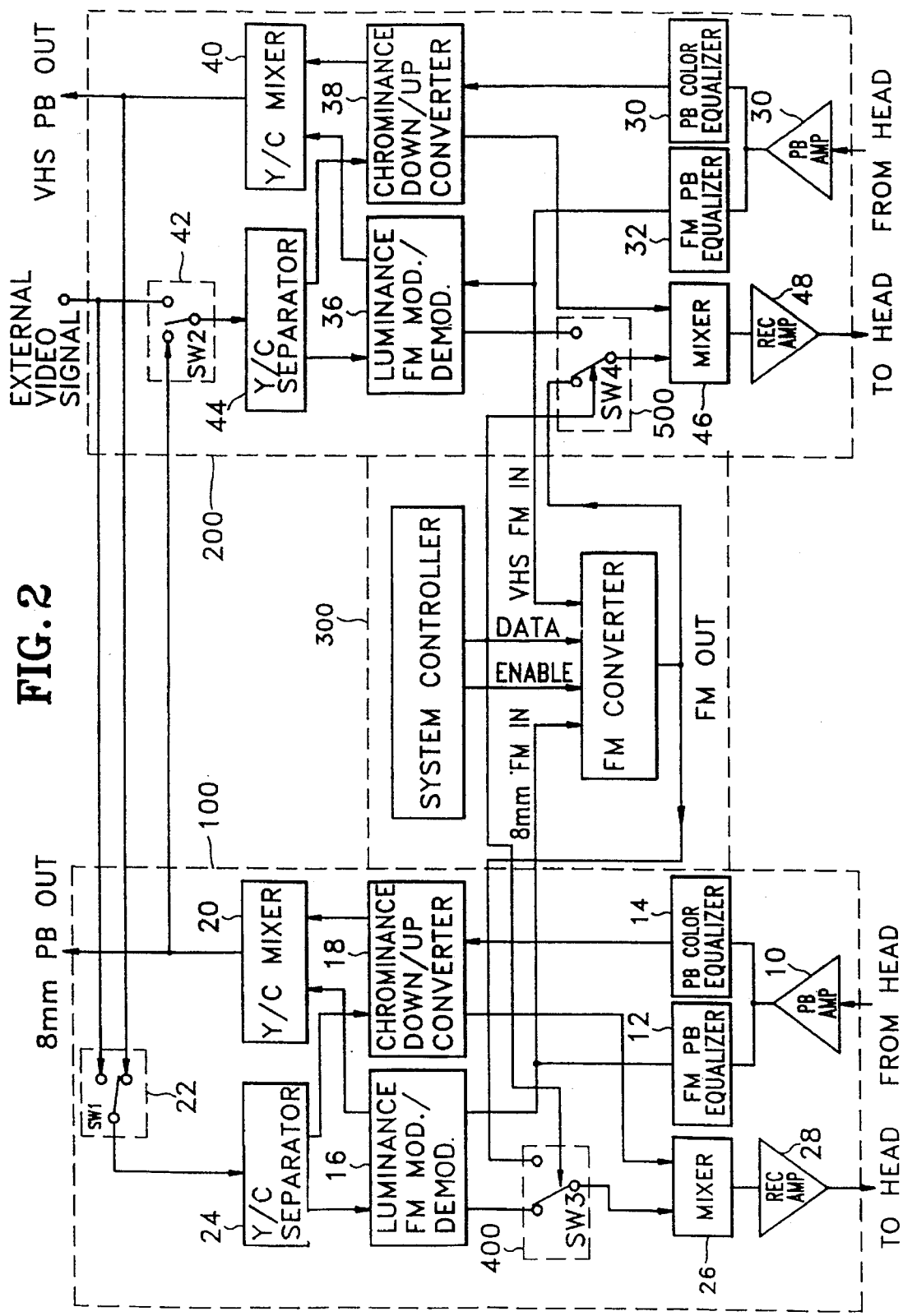
FIG. 2 is a block diagram of a double-deck magnetic recording/reproducing apparatus of the present invention.

In FIG. 2, the same components as those of FIG. 1 are numbered with the same numerals and the detailed description thereof will be omitted. The apparatus of the present invention further comprises an FM converter 300 for receiving the playback FM video signals of a first recording/reproducing portion (or 8 mm recording/reproducing system) 100 and of a second recording/reproducing portion (or VHS recording/reproducing system) 200 and supplying the recording FM video signal to first and second recording/reproducing portions 100 and 200, first switching means 400 for selectively supplying the recording FM video signal supplied from modulator/demodulator 16 of the first recording/reproducing portion 100 and the recording FM video signal supplied from the FM converter 300 to mixer 26 according to a given copying mode, and second switching means 500 for selectively supplying the recording FM video signal supplied from modulator/demodulator 36 of second recording/reproducing portion 200 and the recording FM video signal supplied from the FM converter to mixer 46.

Figure 3:
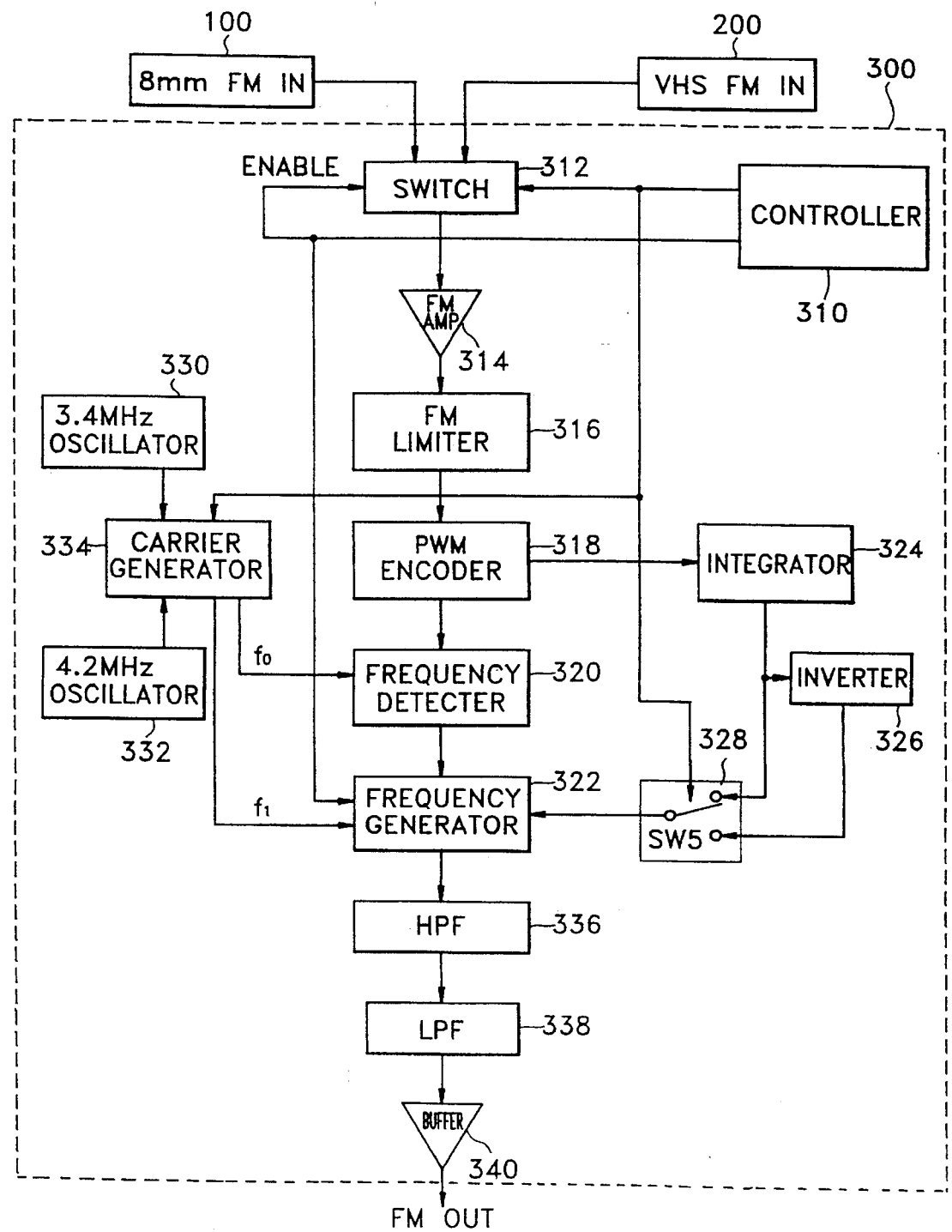
FIG. 3 is a circuit diagram of the FM converter of FIG. 2.

Referring to FIG. 3, the operating mode of FM converter 300 is determined in response to a control signal generated from a controller 310. The FM converter 300 comprises an input selection switch 312 for selectively receiving the playback FM video signals supplied from first and second recording/reproducing portions 100 and 200 according to a copying operation mode given from controller 310, wave-shaping means for receiving the selected playback FM video signal, amplifying the received signal in an amplifier 314, limiting the amplified signal in a limiter 316 and wave-shaping the limited signal in a pulse-width modulating encoder 318, to output a square-wave signal, a frequency detector 320 for comparing the frequency of the wave-shaped square wave signal with the frequency of a given first reference signal and detecting the frequency difference, a control voltage generator composed of an integrator 324, an inverter 326 and a switch 328, for integrating the square-wave signal and thereby selectively generating a direct-current signal proportional to the frequency and a signal in which the direct-current signal is inverted according to the given copying mode, a frequency generator 322 for generating an FM video signal of a predetermined band as a second reference signal in response to the output signal of the frequency detector 320 and the control voltage signal, a reference signal generator composed of a first oscillator 330, a second oscillator 332 and a carrier generator 334, for generating a first reference signal (f0) of 3.4 MHz for VHS and a second reference signal (f1) of 4.2 MHz for 8 mm and alternately supplying the signals to the frequency detector 320 and frequency generator 322, according to the given copying operation mode, and an output circuit composed of a high-pass filter (HPF) 336, a low-pass filter (LPF) 338 and a buffer amplifier 340, for buffering the output of the frequency generator 322.

The operation and effect of the apparatus of the present invention constructed as above will be explained below.

First, in copying an 8 mm format onto a VHS tape, first recording/reproducing portion 100 operates in the playback mode, and second recording/reproducing portion 200 operates in the recording mode. The playback FM video signal reproduced in the first recording/reproducing system is supplied to FM converter 300. The chrominance signal is converted up through chrominance up/down converter 18 and supplied to second recording/reproducing portion 200 through Y/C mixer 20. The chrominance signal is input to separator 44 through second switch 42 of second recording/reproducing system 200, converted down into 629 KHz in chrominance up/down converter 38, and supplied to mixer 46. The playback FM video signal is selected through input selection switch 312 of FM converter 300 and wave-shaped into a square-wave signal by the wave-shaping means (314, 316 and 318). The square-wave signal is supplied to frequency detector 320 and the control voltage generating means (324, 326 and 328). The reference signal generating means (330, 332 and 334) is switching-controlled to supply the 4.2 MHz reference signal to frequency detector 320 and the 3.4 MHz reference signal to the frequency generator 322. Frequency detector 320 compares the input squarewave signal with the reference signal and generates a detection signal for activating the frequency generator if the frequency of the square-wave signal is greater than or equal to 4.2 MHz of the reference as it falls within 4.2–5.4 MHz. The control voltage generating means (324, 326 and 328) generates a control voltage proportional to the frequency of the square-wave signal. The frequency generator 322 generates an FM signal of 3.4–4.4 MHz which varies in proportion to the control voltage referenced to the 3.4 MHz reference signal. The generated FM signal, a recording FM video signal which is converted into the VHS frequency band, is high-pass-filtered and then low-pass-filtered, through the output means (336, 338 and 340), amplified to an appropriate level suitable for mixing with the chrominance signal, and supplied to mixer 46.

Accordingly, the recording is performed so that the chrominance signal is transmitted after frequency conversion and the video signal is directly transmitted as an FM signal, thereby preventing the characteristic deterioration of a video signal.

The case in which a VHS format is copied onto an 8 mm tape is carried out in a manner similar to the above. Here, the first reference signal is 3.4 MHz and the second reference signal is 4.2 MHz. Therefore, the VHS FM signal is detected and then converted into an 8 mm FM signal.

As described above, in copying both the 8 mm tape and VHS tape, the present invention copies a video signal directly as an FM signal without FM modulation/demodulation of a video signal, thereby maintaining high picture quality.

What is claimed is:

1. A double-deck magnetic recording/reproducing apparatus for recording/reproducing a tape for a first format and a tape for a second format, comprising:

a first recording/reproducing portion for, during playback, receiving an FM video signal of a first frequency band picked up from the tape for said first format and a chrominance signal converted down into a first frequency, and mixing an FM-modulated chrominance signal and a converted up chrominance signal to output a composite video signal, and, during recording, separating an input composite video signal into a video signal and a chrominance signal, FM-modulating said separated video signal into the band of said first frequency, and converting down said separated chrominance signal into said first frequency to record the converted signal on the tape for said first format;

a second recording/reproducing portion for, during playback, receiving an FM video signal of a second frequency band picked up from the tape for said second format and a chrominance signal converted down into a second frequency, and mixing an FM-modulated video signal and a converted-up chrominance signal to output a composite video signal, and, during recording, separating an input composite video signal into a video signal and a chrominance signal, FM-modulating said separated video signal into the band of said second frequency, and converting down said separated chrominance signal into said second frequency to record the converted signal on the tape for said second format;

an FM converter for receiving playback FM video signals from said first and second recording/reproducing portions and outputting a recording FM video signal in which the frequency band is converted from one format received according to a given copying mode to the other format;

first switching means for selectively supplying the separated video signal FM-modulated into the band of said first frequency and the recording FM video signal of said FM converter to a recording head for the tape for said first format according to said given copying mode; and second switching means for selectively supplying the separated video signal FM-modulated into the band of said second frequency and the recording FM video signal of said FM converter to a recording head for the tape for said second format according to said given copying mode.

2. A double-deck magnetic recording/reproducing apparatus as claimed in claim 1, wherein said FM converter comprises:

input selection switching means for selectively receiving the playback FM video signals from said first and second recording/reproducing portions according to a given copying mode;

wave-shaping means for receiving said selected play-back FM video signal and generating a square-wave signal;

frequency detecting means for comparing the frequency of said square-wave signal with the frequency of a given first reference signal and detecting the frequency difference;

control voltage generating means for integrating said square-wave signal and selectively generating a direct-current signal proportional to the frequency and a signal in which said direct-current signal is inverted, as a control voltage signal, according to said given copying mode;

frequency generating means for generating an FM video signal of a predetermined band at a given second reference signal in response to said frequency detection signal and said control voltage signal;

reference signal generating means for selectively generating said first reference signal for said first format and said second reference signal for said second format according to said given copying mode and supplying said first and second reference signals to said frequency detecting means and frequency generating means; and output means for buffering and outputting the output of said frequency generating means.

3. A double-deck magnetic recording/reproducing apparatus as claimed in claim 1, wherein said first format is an 8 mm format.

4. A double-deck magnetic recording/reproducing apparatus as claimed in claim 1, wherein said second format is a VHS format.

* * * * *